H. L. McCLAREN.
RUBBER TIRE TREAD.
APPLICATION FILED SEPT. 5, 1912.
1,071,071.
Patented Aug. 26, 1913.
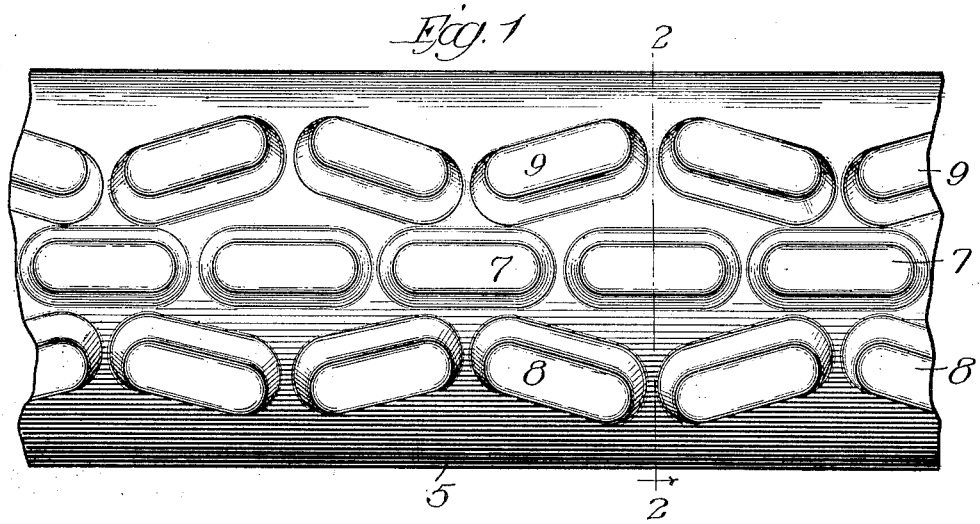
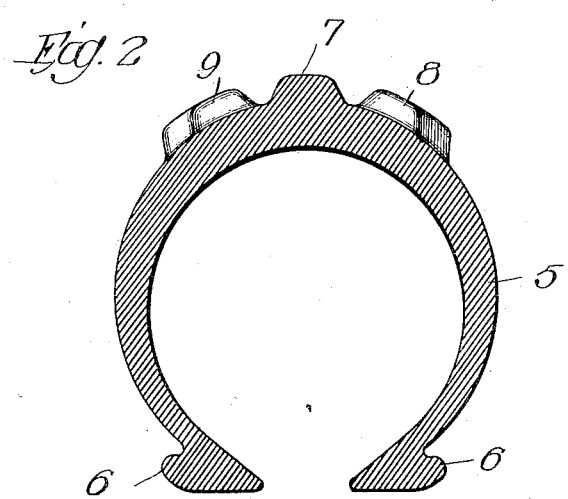
Witnesses:
Inventor
Harry L. McClaren,
by Linthicum Belt Fuller
Attys.

UNITED STATES PATENT OFFICE.

HARRY L. McCLAREN, OF RACINE, WISCONSIN, ASSIGNOR TO RACINE RUBBER COMPANY, OF RACINE, WISCONSIN, A CORPORATION OF WISCONSIN.

RUBBER-TIRE TREAD.

1,071,071.          Specification of Letters Patent.     Patented Aug. 26, 1913.

Application filed September 5, 1912. Serial No. 718,611.

*To all whom it may concern:*

Be it known that I, HARRY L. MCCLAREN, of Racine, in the county of Racine and State of Wisconsin, have invented certain new and useful Improvements in Rubber-Tire Treads, of which the following is a specification.

This invention relates to tires for vehicle wheels and more particularly to the tread of the tire, one of the primary objects of the invention being to provide a tire which will have superior road gripping qualities and will prevent the vehicle from skidding.

The invention will be readily understood from the following description when considered in connection with the accompanying drawings illustrating one preferred embodiment thereof.

Referring to the drawings—Figure 1 is a face view of a fragment of a tire equipped with my invention; and Fig. 2 is a transverse sectional view on the line 2—2 of Fig. 1.

On the drawings, 5 designates generally the casing which is usually a built-up structure composed of layers of fabric and rubber, or other similar material. The casing, however, may be of any well known or preferred construction and is preferably equipped with the usual clencher beads 6.

In order to afford a gripping action between the tire and the road to prevent slippage and skidding of the wheels, I have provided the tread portion of the tire with a series of studs arranged in a novel and superior manner upon the face of the tread to afford a maximum resistance to slippage and skidding. The individual studs, which are preferably of elongated or oblong shape having flat outer surfaces, are arranged in a plurality of rows designated on the drawings by reference characters 7, 8 and 9, respectively. The studs of the row 7 are arranged circumferentially of the tire with their longitudinal axes in alinement as shown. The studs of rows 8 and 9 however, are so arranged that their axes are disposed at an angle to the axes of the studs in row 7 and the axis of each individual stud in rows 8 and 9 is disposed at an angle to the axes of adjacent studs in the same row and disposed at an angle to the axis also of its companion stud of the other row. This arrangement of the studs in the rows affords a strong gripping action between the tire and the surface of the road and serves to prevent skidding of the wheels. The ends of the individual studs in each row are also disposed in alternation circumferentially of the tire with the ends of the studs in adjacent rows, so that each stud is offset, so to speak, from the studs of adjacent rows and the joints between the studs of each row are therefore staggered or arranged in alternation with the joints of adjacent rows. This arrangement and relative positioning of the studs enables the tire to firmly grip the road surface over which it is traveling and affords a maximum resistance to slippage of the wheels.

It is believed that my invention and many of its attendant advantages will be understood from the foregoing without further description and it will be obvious that the size, shape and relative proportions of the various parts may be modified without departure from the spirit of the invention or the sacrifice of any of the material advantages thereof.

I claim:

A tire for vehicle wheels provided with an inner row of circumferentially arranged elongated studs having their longitudinal axes disposed in alinement, and an outer row of elongated studs arranged upon each side of the said inner row, the longitudinal axes of the studs forming the outer rows being inclined to the longitudinal axes of the studs forming the inner row and to the axes of the adjacent studs forming the same row, and the corresponding studs upon the said outer rows being arranged in pairs with their longitudinal axes inclined one to the other each stud of the inner rows having its ends disposed between adjacent pairs of studs forming the outer rows.

HARRY L. McCLAREN.

Witnesses:
MARTIN J. SELLERS,
GUY W. MORGAN.

Copies of this patent may be obtained for five cents each, by addressing the "Commissioner of Patents, Washington, D. C."